(12) United States Patent
Jiang et al.

(10) Patent No.: US 9,127,370 B2
(45) Date of Patent: Sep. 8, 2015

(54) POWER-FREE APPARATUS FOR HYDROGEN GENERATION FROM ALCOHOL

(71) Applicant: U.S. Army Research Laboratory, Adelphi, MD (US)

(72) Inventors: Rongzhong Jiang, Olney, MD (US); Dat Tien Tran, Perry Hall, MD (US); Deryn D. Chu, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 170 days.

(21) Appl. No.: 14/030,123

(22) Filed: Sep. 18, 2013

(65) Prior Publication Data

US 2015/0075997 A1     Mar. 19, 2015

(51) Int. Cl.
*C25B 1/02* (2006.01)
*C25B 9/18* (2006.01)
*H01M 16/00* (2006.01)

(52) U.S. Cl.
CPC ... *C25B 1/02* (2013.01); *C25B 9/18* (2013.01); *H01M 16/003* (2013.01)

(58) Field of Classification Search
CPC .................................. C25B 1/02; C25B 9/18
USPC ................... 204/248, 258, 266; 205/343, 637
See application file for complete search history.

(56) References Cited

U.S. PATENT DOCUMENTS 4,839,247 A * 6/1989 Levy et al. ..................... 429/422
6,299,744 B1 * 10/2001 Narayanan et al. ........... 204/263
6,432,284 B1   8/2002 Narayanan et al.

(Continued)

OTHER PUBLICATIONS

Li, Sheng-De; Wang, Cheng-Chien; Chen, Chuh-Yung, "Water electrolysis for H2 production using a novel bipolar membrane in low salt concentration," Journal of Membrane Science, 330 (2009) 334-340.
Hung, Chi-Yuan; Li, Sheng-De; Wang, Cheng-Chien; Chen, Chuh-Yung, "Influences of a bipolar membrane and an ultrasolic field on alkaline water electrolysis," Journal of Membrane Science, 389 (2012) 197-204.

(Continued)

*Primary Examiner* — Nicholas A Smith
(74) *Attorney, Agent, or Firm* — Freda L. Krosnick; Robert Thompson

(57) ABSTRACT

An apparatus and method for generating low pressure hydrogen gas from fuel solutions (i.e., alcohols) without the use of an external power source or external heat source. The apparatus comprises (a) a first chamber for fuel storage having an aperture, (b) a second chamber for the temporary storage of hydrogen gas generated having an aperture, (c) a first electrochemical cell (Cell-1) and (d) a second electrochemical cell (Cell-2). Cell-2 is disposed between the first chamber and the second chamber so that its anode is in fluid communication with the first chamber and its cathode is in fluid communication with the second chamber. Cell-1 is disposed on the opposite side of the first chamber from Cell-2 so that the anode therein is in fluid communication with the first chamber, and the cathode therein is in fluid communication with an oxidizing agent. The first chamber is sandwiched between Cell-1 and Cell-2. An air convection window or like device making ambient air available to the apparatus via Cell-1 is positioned on the side of Cell-1 opposite the fuel chamber. In operation, fuel is provided to the first chamber, the anode of Cell-1 is connected to the cathode of Cell-2, and the cathode of Cell-1 is connected to the anode of Cell-2, and hydrogen gas is continuously generated from the hydrogen chamber. The present invention may be used at room temperature.

18 Claims, 12 Drawing Sheets

(56) References Cited

U.S. PATENT DOCUMENTS

| | | |
|---|---|---|
| 7,056,428 B2 | 6/2006 | Narayanan et al. |
| 7,399,392 B2 | 7/2008 | Woods et al. |
| 7,455,829 B2 | 11/2008 | Eickhoff et al. |
| 7,541,109 B2 | 6/2009 | Ren et al. |
| 8,133,464 B2 | 3/2012 | Laurenczy et al. |
| 8,383,290 B2 | 2/2013 | Jiang et al. |
| 2004/0180249 A1* | 9/2004 | Pham et al. ............... 429/33 |
| 2008/0190780 A1* | 8/2008 | Wang ...................... 205/637 |
| 2010/0104904 A1* | 4/2010 | Rao et al. ................. 429/21 |
| 2012/0031772 A1* | 2/2012 | Dean et al. ............... 205/637 |

OTHER PUBLICATIONS

Meregalli, V.; Parrinello, M., "Review of theoretical calculations of hydrogen storage in carbon-based materials," Applied Physics A 72, 143-146 (2001).

Jain, I.P.; Jain, P.; Jain, A, "Novel hydrogen storage materials: A review of lightweight complex hydrides," J. of Alloys and Compounds, 503 (2010) 303-339.

\* cited by examiner

POWER-FREE APPARATUS FOR HYDROGEN GENERATION FROM ALCOHOL

STATEMENT OF GOVERNMENT INTEREST

The invention described herein may be manufactured, used, and licensed by or for the United States Government without the payment of royalties.

FIELD OF THE INVENTION

The present invention relates to the field of electrochemistry, and, in particular, to a power-free apparatus suitable for continuous generation of hydrogen gas in the presence of a fuel, such as an alcohol/water solution.

BACKGROUND OF THE INVENTION

Hydrogen is considered to be the most promising clean fuel for various applications, such as for use in hydrogen/air fuel cells, electric vehicles using such hydrogen fuel cells as the power generator, and chemical synthesis.

Hydrogen gas production has traditionally been achieved via two primary methodologies—(1) fuel reformation and (2) water electrolysis each of which have drawbacks.

Fuel reformation, such as steam reformation and plasma reformation, requires the use of high temperatures (i.e., 300° C.-800° C.), using, for example, coal, petroleum and natural gas. This technique has low energy efficiency, involves complex chemical reactions, has a short life, produces toxic chemical gases, has a low hydrogen conversion percentage, and generates hydrogen that is impure. (P. K. Cheekatamarla, and C. M. Finnerty, "Reforming catalysts for hydrogen generation in fuel cell applications," Journal of Power Sources 160 (1) (2006) 490; C. C. Su; C. Y. Huang; Y. M. Sun; et al., "Performance of catalysts CuO—ZnO—Al 2O 3, CuO—ZnO—Al 2O 3-Pt—Rh, and Pt—Rh in a small reformer for hydrogen generation," Journal of Power Sources 166 (2) (2007) 450.)

While water electrolysis results in pure hydrogen gas, it requires the use of an external energy source, such as an electric energy source or a battery, to operate causing additional power consumption. Moreover, water electrolysis often exhibits low energy efficiency. Methods of generating hydrogen via electrolysis of organic chemical and water solutions are taught, for example, in U.S. Pat. No. 6,432,284, U.S. Pat. No. 7,056,428, U.S. Pat. No. 8,133,464 and U.S. Pat. No. 7,399,392. The teachings of these patents are incorporated herein by reference in their entirety.

In addition to these drawbacks, once hydrogen gas is generated, containerization and transportation of hydrogen is a barrier for its practical application. In an effort to overcome this barrier, efforts in finding suitable materials that may be used to store and transport hydrogen are being explored. Materials such as metal alanates, hydrides, amides, imides, and carbon based materials for hydrogen storage are being evaluated. (Jain, I. P.; Jain, P.; Jain, A., *Alloy and Compounds*, 503 (2010) 303-339 and Meregalli, V.; Parrinello, M., *Applied Physics, A*72 (2001)143-146) These materials, however, are either corrosive, toxic, unstable or have very low capacity for hydrogen storage.

The hydrogen generation apparatus of the present invention remedies these limitations in that it does not require high temperature heating, an external energy source to operate, or containerization.

BRIEF DESCRIPTION OF THE INVENTION

The present invention relates to an apparatus and method for generating hydrogen for use in a variety of applications, such as, for example purposes only, providing hydrogen for fuel cells and providing hydrogen for use in industrial applications such as the synthesis of ammonia and hydrochloric acid. In particular, the present invention provides an environmentally friendly apparatus for the automatic generation of hydrogen, wherein hydrogen generation is accomplished without the use of an external power source (electric or battery) or the use of an external heat source.

Disclosed herein is an apparatus for the automatic and continuous generation of hydrogen gas using a fuel solution, wherein the apparatus may be operated at room temperature. The apparatus uses self-generated electric power for electrolysis of, for example, an alcohol/water solution to generate hydrogen.

The apparatus comprises (a) a first chamber for fuel storage (also referred to herein as "fuel chamber") comprising an aperture, (b) a second chamber for temporary hydrogen storage (also referred to herein as "hydrogen chamber") comprising an aperture, (c) a first electrochemical cell (Cell-1) and (d) a second electrochemical cell (Cell-2); wherein Cell-2 is disposed between and in contact with the first chamber and the second chamber; Cell-1 is disposed at the opposite side of and in contact with the first chamber. The first chamber is sandwiched between Cell-1 and Cell-2. Cell-1 and Cell-2 are present in the apparatus such that the anode of each are in fluid communication with the first chamber, and hence would be in fluid communication with fuel provided to the first chamber. The cathode of Cell-2 is in fluid communication with the second chamber, while the cathode of Cell-1 is exposed to ambient air (oxidizer supply) via, for example, an air convection window.

Cell-1 and Cell-2 each comprises a membrane electrode assembly (MEA) having an electrolyte membrane sandwiched between an anode and a cathode. The MEA is disposed between a cathode current collector and an anode current collector, a first gas diffusion layer is disposed between the MEA and the cathode current collector, and a second gas diffusion layer is disposed between the MEA and the anode current collector.

In operation, the anode of Cell-1 is connected to the cathode of Cell-2, and the cathode of Cell-1 is connected to the anode of Cell-2. Fuel is provided to the first chamber through an aperture therein (fuel inlet/port), hydrogen is then generated into the second chamber, and the hydrogen generated exits from the second chamber through an aperture therein (hydrogen outlet/port) for use. Fuel oxidation occurs at the two anodes. Oxygen reduction occurs at the cathode of Cell-1 to generate water; and proton reduction occurs at the cathode of Cell-2 to generate hydrogen. Protons needed by the cathode of Cell-2 are generated from its anode via fuel oxidation.

In some embodiments, the first chamber and the second chamber of the apparatus are defined by two separate housings. The first chamber is defined by a first housing having a first open side and a second open side, and having at least one aperture; and the second chamber is defined by a second housing having one open side and at least one aperture.

In other embodiments, the apparatus comprises a housing defining both the first chamber having an aperture and the second chamber having an aperture. The housing has one opening exposed to an oxidizing agent and a wall opposite said opening. Cell-1 and Cell-2 are each disposed in separate spaced apart locations within the housing, and partition the housing to create a first chamber and a second chamber therein.

In further embodiments, the apparatus comprises a housing defining both the first chamber having an aperture and the second chamber having an aperture, where the housing has one opening exposed to an oxidizing agent and a wall opposite said opening; and Cell-1 is disposed at the one opening, and Cell-2 is disposed at a location within the housing. Cell-1 and Cell-2 partition the housing to create a first chamber and a second chamber therein.

In still a further embodiment, the apparatus is a modular apparatus comprising a plurality of components assembled as described and illustrated herein.

The embodiments described are provided for example purposes only. The invention is not intended to be limited thereto.

An apparatus for generating hydrogen without the use of an external energy source or heat source, and a method of using the apparatus are claimed herein.

BRIEF DESCRIPTION OF THE DRAWINGS

The present invention may further be described with reference to the following figures.

Figure 1A:
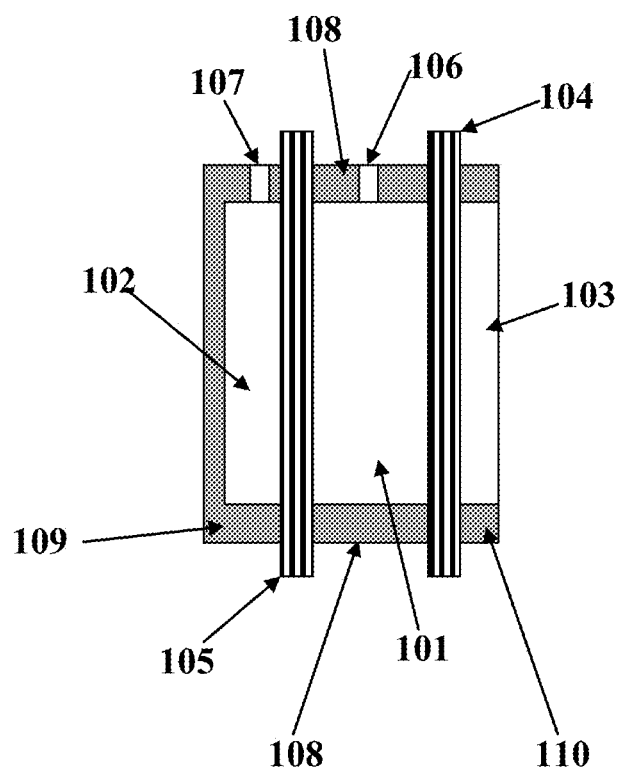
FIG. 1A is a schematic view of a power-free apparatus for hydrogen generation within the scope of the present invention.

The figures are provided for use in describing the present invention. While specific embodiments of the present invention are illustrated and described, the invention is not intended to be limited to the embodiments set forth therein. Other embodiments of the present invention are also contemplated, as noted in the description set forth herein. Applicants submit that other modifications and embodiments can be devised by those skilled in the art which fall within the scope and spirit of the principles of the present invention.

DETAILED DESCRIPTION OF THE INVENTION

As used herein, the phrase "power-free" means without the use of an external electric energy source or an external heat source. In particular, it is used with reference to the apparatus of the present invention, and its use in generating hydrogen, wherein no external energy source or heat source is employed therein.

The phrases "fuel chamber" and "first chamber" are used interchangeably herein.

The phrases "hydrogen chamber" and "second chamber" are used interchangeably herein.

The terms "second electrochemical cell" and "Cell-2" are used interchangeably herein, and refer to the electrochemical cell disposed between the "fuel chamber" and the "hydrogen chamber" as described and illustrated.

The terms "first electrochemical cell" and "Cell-1" are used interchangeably herein, and refer to the electrochemical cell present on the opposite side of the "fuel chamber" from Cell-2 as described. Ambient air is provided to the apparatus to facilitate the generation of electricity via the cathode of Cell-1 as described and illustrated.

The term "aperture" as used herein refers to a port present in a housing defining the first chamber and/or the second chamber. When used with reference to the first chamber, fuel is provided to the chamber therethrough (fuel inlet/port) and/or carbon dioxide generated exits therethrough ($CO_2$ outlet/port). When used with reference to the second chamber, hydrogen gas generated exits therethrough ($H_2$ outlet/port).

The present invention is directed to a method for generating hydrogen without the use of an external electric energy source or, external heating source, and an apparatus for accomplishing the same. The invention may be described with reference to the figures. Reference numerals are used consistently throughout the figures to represent the same element.

In general, the apparatus comprises (a) a first chamber for fuel storage having at least one aperture, (b) a second chamber for temporary hydrogen storage having at least one aperture, (c) a first electrochemical cell (Cell-1), and (d) a second electrochemical cell (Cell-2), wherein Cell-2 is disposed between and in contact with the first chamber and the second chamber; Cell-1 is disposed at the opposite side of the first chamber from Cell-2. The first chamber is sandwiched between Cell-1 and Cell-2. Cell-1 and Cell-2 are present in the apparatus such that the anode of each are in fluid communication with the first chamber, and hence would be in fluid communication with fuel provided to the first chamber. The cathode of Cell-2 is in fluid communication with the second chamber, while the cathode of Cell-1 is exposed to ambient air (oxidizer supply) via, for example, an air convection window.

Figure 1B:
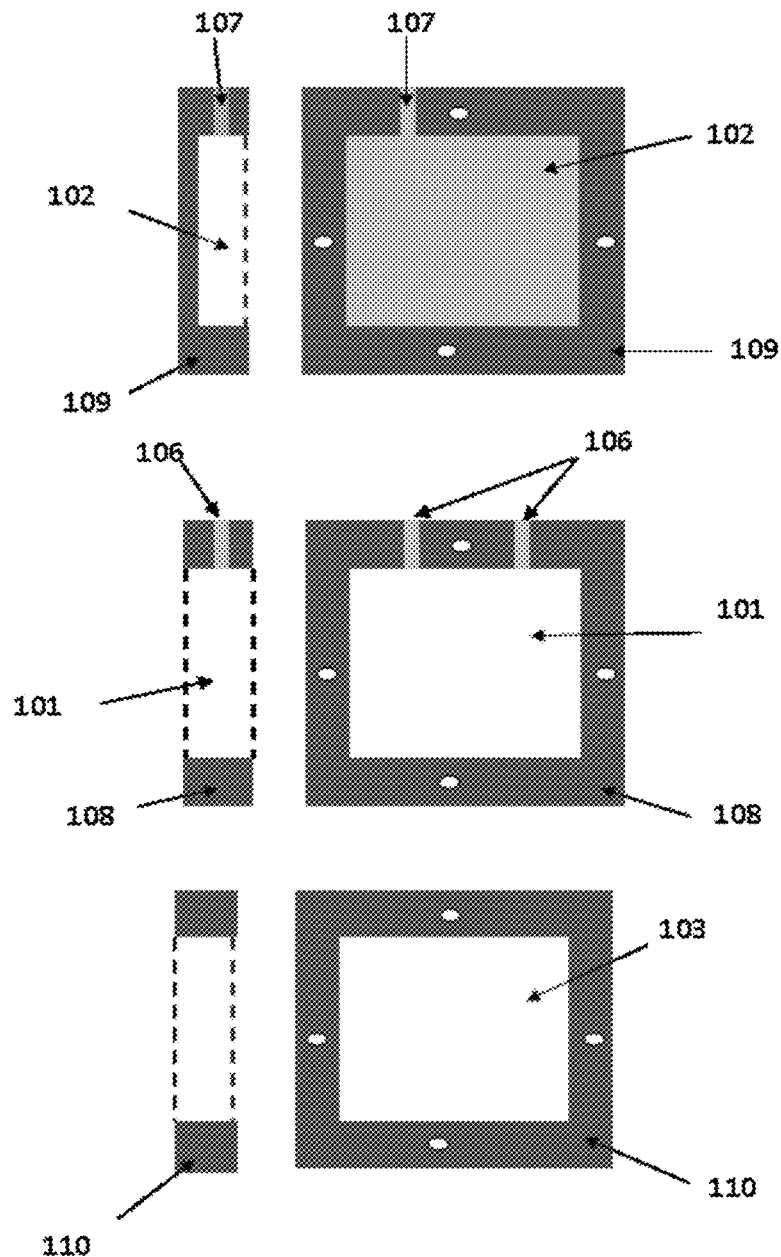
FIG. 1B provides schematic front and side views of the hydrogen chamber, the fuel chamber and the air window of the apparatus as illustrated in FIG. 1A.
Figure 4:
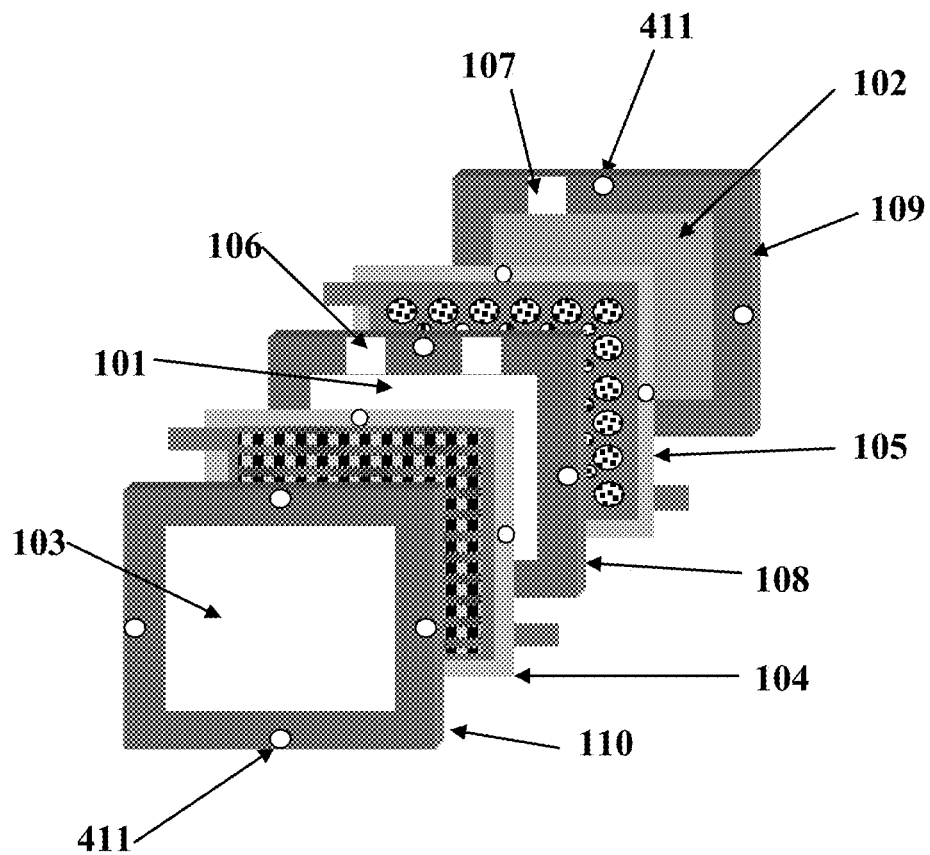
FIG. 4 is an exploded view of parts/components arrangement, of a power-free apparatus for hydrogen generation within the scope of the present invention.

Embodiments wherein the first chamber and the second chamber within the apparatus are each defined by a separate housing are illustrated and described herein with reference to FIG. 1A, FIG. 1B and FIG. 4. In such embodiments, the first chamber is defined by a first housing and the second chamber is defined by a second housing.

Embodiments wherein the first chamber and the second chamber of the apparatus are together defined by a single/shared housing are illustrated and described with reference to FIG. 1C.

FIG. 1A provides a schematic illustration of a power-free apparatus for hydrogen generation. The apparatus comprises a first chamber 101 having two apertures 106, a second chamber 102 having an aperture 107, a first electrochemical cell 104 (Cell-1), a second electrochemical cell 105 (Cell-2), and an air convection window 103.

Cell-2 105 is disposed between first chamber 101 and second chamber 102; Cell-1 104 is disposed on the opposite side of said first chamber 101 from Cell-2 105. First chamber 101 is sandwiched between Cell-1 104 and Cell-2 105. The anode (not shown) of Cell-1 104 and the anode (not shown) of Cell-2 105 are in fluid communication with said first chamber 101. The cathode (not shown) of Cell-2 105 is in fluid communication with the second chamber 102; and the cathode (not shown) of Cell-1 104 is in fluid communication with an oxidizing agent (i.e., air) via air convection window 103.

FIG. 1B provides schematic front and side views of the housings defining the first chamber 101, the second chamber 102, and the air convection window 103 as illustrated in FIG. 1A.

As illustrated, the first chamber 101 is defined by a first housing 108 having a first open side and a second open side—represented by dashed lines in FIG. 1B, where the first open side and second open side are in spaced apart relationship. First housing 108 further comprises two apertures 106—one through which fuel is introduced to the first chamber 101, and one through which carbon dioxide generated exits during use. The second chamber 102 is physically defined by a second housing 109 having one open side—represented by dashed lines in FIG. 1B, and having one aperture 107 through which hydrogen gas produced during operation exits from the second chamber 102 for use thereof. Cell-1 104 is disposed at the first open side of the first housing 108 in a fashion such that the anode therein is in fluid communication with said first open side of the first housing 108; Cell-2 105 is disposed at the second open side of the first housing 108 in such a fashion such that the anode therein is also in fluid communication with said second open side of the first housing 108. The anode of Cell-1 104 and the anode of Cell-2 105 are each in fluid communication with the respective open side of the first housing 108, and hence would be in fluid communication with fuel presented into the fuel chamber 101. In addition to being disposed at the second open side of the first housing 108, Cell-2 105 is also disposed at the one open side of second housing 109 so that its cathode is in fluid communication with the one open side, and hence second chamber 102 as illustrated. The cathode of Cell-1 104 faces and is in fluid communication with an oxidizing agent (i.e., air) via convection window 103 defined by housing 110.

Figure 1C:
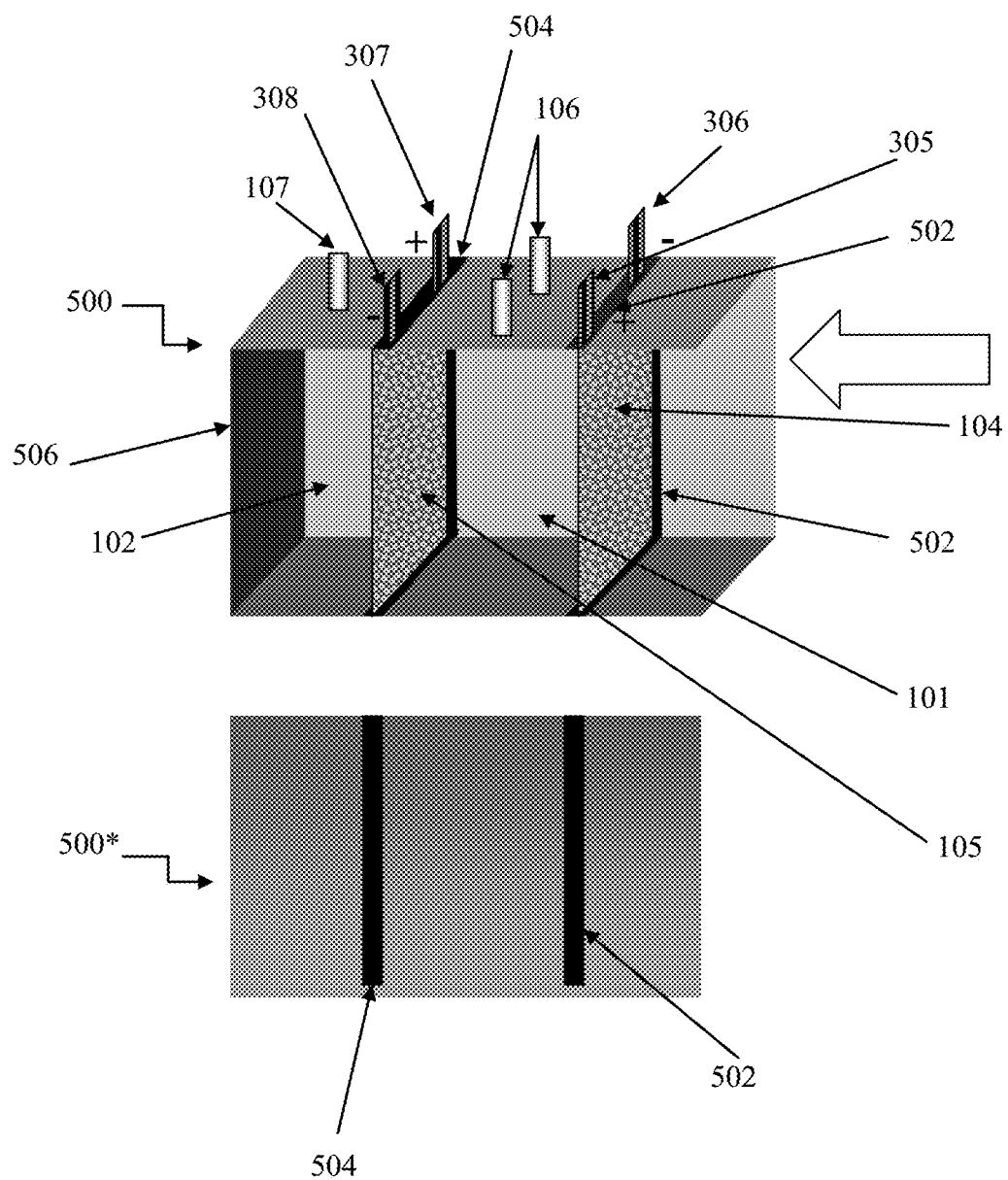
FIG. 1C is a schematic illustration of an alternate embodiment of a power-free apparatus for hydrogen generation.

FIG. 1C illustrates an embodiment wherein the apparatus comprises a single housing defining both the first chamber 101 and the second chamber 102. FIG. 1C provides an open side view of a power-free apparatus for generating hydrogen from a fuel, wherein side 500\* of housing 500 is cut away so as to expose the interior of the apparatus. Side 500\*, as illustrated, provides a view of the interior surface of said side. The apparatus comprises a single housing 500 having one opening exposed to an oxidizing agent (i.e., ambient air—illustrated by an arrow), and a wall 506 opposite said opening. Cell-1 104 is disposed at a first location within the housing 500, where the first location is in spaced apart relationship to the one opening of the housing; and Cell-2 105 is disposed at a second location within the housing 500, on the opposite side of Cell-1 104 from the one opening and between Cell-1 104 and the wall 506 opposite said opening. The first location and the second location are in spaced apart relationship as illustrated. Cell-1 104 and Cell-2 105 partition the interior of housing 500 so as to create a first chamber 101 and a second chamber 102 therein. First chamber 101 is sandwiched between Cell-1 104 and Cell-2 105. Cell-1 104 and Cell-2 105 are disposed in the apparatus so that the anode of each is in fluid communication with the first chamber 101. The cathode of Cell-1 104 is in fluid communication with an oxidizing agent, while the cathode of Cell-2 105 is in fluid communication with the second chamber 102. Housing 500 comprises two apertures 106 therein—one through which fuel may be provided to the first chamber 101 and one through which carbon dioxide may exit therefrom, and an aperture 107 through which hydrogen gas produced exits from the second chamber 102. Of note is that the aperture 107 is the only means present through which hydrogen gas produced exits the second chamber 102.

As illustrated, Cell-1 104 is disposed in a first slot 502, and Cell-2 105 is disposed in a second slot 504. Slot 502 and slot 504 each have one opening through which an electrochemical cell may be inserted therein. The opening of each slot is illustrated as being on the upper side of housing 500.

Slots 502 and 504 may each be described as a channel or groove into which an electrochemical cell may be inserted. Each slot may serve to guide the insertion of an electrochemical cell therein, and may further assist in sealing the first chamber 101 and the second chamber 102 from leakage once an electrochemical cell has been inserted therein. Cell-1 104 and Cell-2 105 are disposed in the slots 502 and 504, respectively, so as to form a seal with the housing 500 so that there is no leakage of fuel presented into first chamber 101 or hydrogen generated into second chamber 102 from each respective chamber.

A further embodiment, though not specifically illustrated, can be described with reference to FIG. 1C as it is a variation of the embodiment illustrated therein. In this embodiment, the apparatus comprises a single housing 500 having one opening exposed to an oxidizing agent (i.e., ambient air—illustrated by an arrow), a wall 506 opposite said opening, Cell-1 104 disposed at the one opening of housing 500 (as opposed to within housing 500 as illustrated), and Cell-2 105 disposed at a location within the housing 500 in spaced apart relationship to and between the one opening and wall 506 opposite said opening. First chamber 101 is sandwiched between Cell-1 104 and Cell-2 105. The anode of Cell-1 104 and the anode of Cell-2 105 are both in fluid communication with the first chamber 101. The cathode of Cell-1 104 is in fluid communication with an oxidizing agent, while the cathode of Cell-2 105 is in fluid communication with the second chamber 102. Cell-2 105 is disposed in slot 504. Slot 502, set forth in FIG. 1C is not present in this embodiment. Apertures 106 and 107 are present in housing 500 as illustrated. An air convection window (not illustrated, but similar to that illustrated in FIG. 1B as 110) would be disposed against the cathode side of Cell-1 104.

As illustrated in the embodiment set forth in FIG. 1C, the housing comprises slots having one opening through which an electrochemical cell may be inserted. The invention is not intended to be so limited, as the invention does not require the use of slots as other methods may be used to facilitate positioning of the cells within the housing. One having ordinary skill in the art will recognize alternate methods that may be employed for accomplishing the same. Moreover, where slots are present in the housing, more than one slot opening may be provided through which an electrochemical cell may be inserted. For example, a slot may have two slot openings on opposite sides of a housing. In addition, other embodiments are envisioned wherein the apparatus may be made in such a fashion such that the electrochemical cells and the housing are a single integrated unit from which the electrochemical cells may not be removed—i.e., wherein the electrochemical cells are molded into, and along with the housing. When slots are employed, they may be composed of sealing materials, such as Teflon®, plastic and rubber frames, or other materials suitable for the purposes described herein.

In the Figures herein, the first chamber 101 is illustrated as having two apertures 106, and the second chamber 102 as having one aperture 107. Although having these numbers of apertures is preferred, the invention is not intended to be so limited. When the first chamber 101 has two apertures 106, for example, fuel may be continuously provided into the first chamber 101 via one of the apertures (one designated aperture for fuel inlet/port), while carbon dioxide would exit from the other (one designated $CO_2$ outlet/port). First chamber 101 may alternatively, for example, have one aperture through which fuel may be introduced and carbon dioxide may exit. In addition, the second chamber 102 may have more than one aperture as well.

First housing 108, second housing 109, air convection window housing 110, and single housing 500 may be composed of one or more insulating materials, such as for example purposes only, plastic, ceramic, and glass. These housings may also be fabricated from an electrically conducting material provided that an electrically resistive coating is disposed thereon. One having ordinary skill in the art with knowledge of the present invention and its operation will be able to select a suitable material to use for the housing for the purpose intended.

Figure 2:
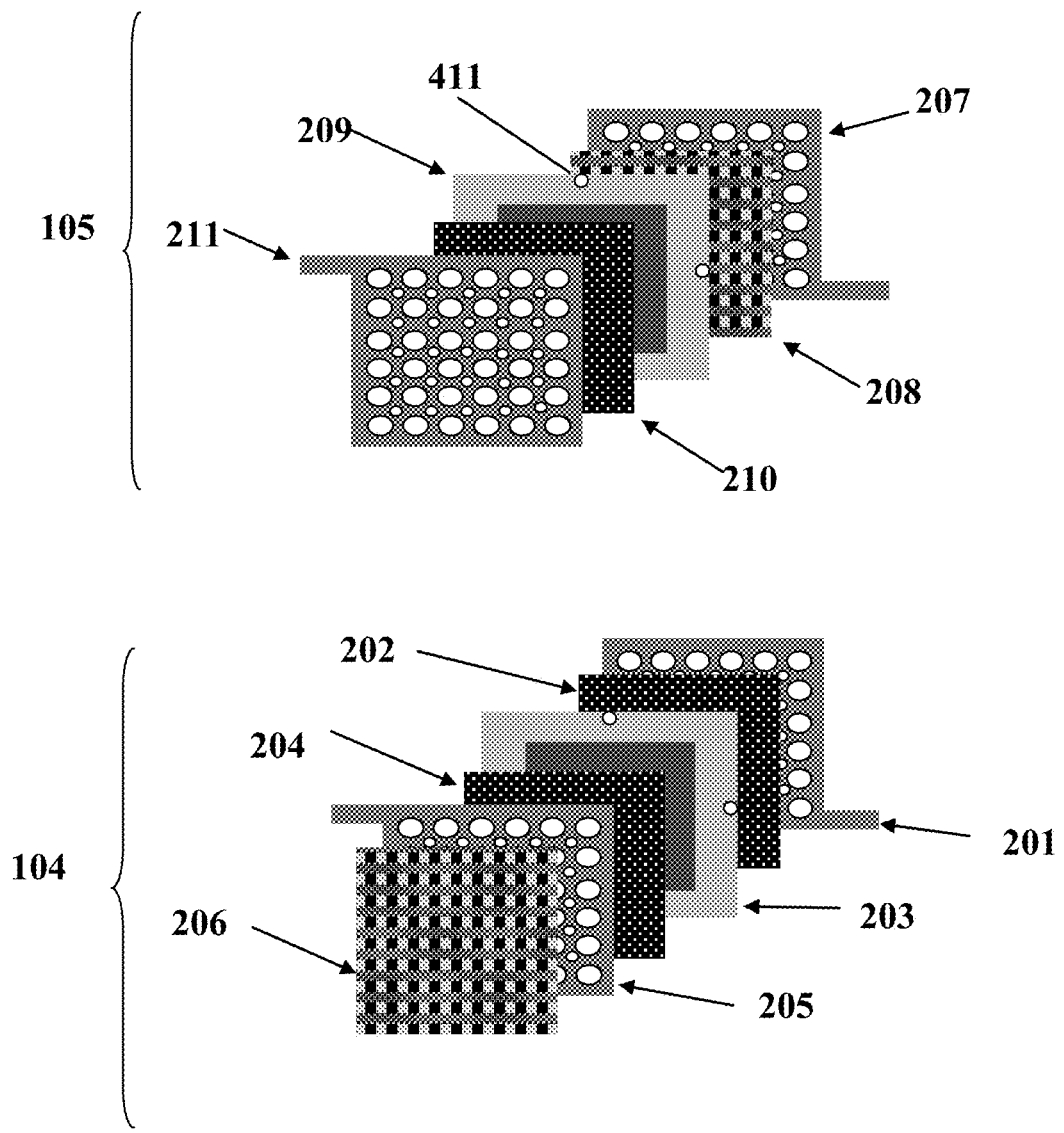
FIG. 2 provides an exploded view of Cell-1 and Cell-2, illustrated as 104 and 105, respectively.

Each of Cell-1 104 and Cell-2 105 comprises a membrane electrode assembly (MEA), a cathode current collector, an anode current collector, a first gas diffusion layer and a second gas diffusion layer. Cell-1 104 may further comprise a hydrophobic air filter. The components of Cell-1 104 and Cell-2 105 may be described with reference to FIG. 2.

Cell-1 104 comprises membrane electrode assembly-1 (MEA-1) 203, disposed between cathode current collector 205 and anode current collector 201. Cathode current collector 205 is present on the cathode side of MEA-1 203 and is in electrical contact with the cathode (not shown) of MEA-1 203; anode current collector 201 is disposed on the anode side of MEA-1 203 and is in electrical contact with the anode (not shown) of MEA-1 203. First gas diffusion layer 204, which is present therein for air diffusion, is disposed between MEA-1 203 and cathode current collector 205. Second gas diffusion layer 202, which is present therein for fuel diffusion, is disposed between MEA-1 203 and anode current collector 201. Cell-1 104 may further comprise a hydrophobic air filter 206 disposed adjacent cathode current collector 205. For illustration purposes only, MEA-1 203 may be made with a proton exchange membrane, such as Nafion 117 (DuPont Co.), having a catalyst layer coated on both its sides. First gas diffusion layer 204 and air filter 206 may comprise a carbon cloth coated with a mixture of carbon powder and Teflon® (polytetrafluoroethylene by DuPont Co.), having a Teflon® content of greater than approximately 20% wt., but less than approximately 40% wt. Second gas diffusion layer 202, for example, may comprise a carbon cloth coated with a mixture of carbon powder and Teflon®, having a Teflon® content of less than approximately 10% wt., but greater than approximately 2% wt. Current collectors 201 and 205 have small holes therein for passing fuel and air, respectively.

Cell-2, illustrated at 105, comprises membrane electrode assembly-2 (MEA-2) 209, disposed between cathode current collector 207 and anode current collector 211. Cathode current collector 207 is present on the cathode side of MEA-2 209 and is in electrical contact with the cathode (not shown) of MEA-2 209; anode current collector 211 is present on the anode side of MEA-2, 209 and is in electrical contact with the anode (not shown) of MEA-2 209. First gas diffusion layer 208, which is present therein for hydrogen evolution, is disposed between MEA-2, 209, and cathode current collector 207; second gas diffusion layer 210, which is present therein for fuel diffusion, is disposed between MEA-2 209 and anode current collector 211. For illustration purposes only, MEA-2, 209, may be made with a proton exchange membrane, such as Nafion 117 (DuPont Co.), having a catalyst layer coated on both its sides. First gas diffusion layer 208, for example, may comprise a carbon cloth coated with a mixture of carbon powder and Teflon®, having a Teflon® content of greater than approximately 20% wt., but less than approximately 40% wt.; and second gas diffusion layer 210, for example, may comprise a carbon cloth coated with a mixture of carbon powder and Teflon®, having a Teflon® content of less than approximately 10% wt., but greater than approximately 2% wt. Current collectors 207 and 211 have small holes therein for passing hydrogen gas and fuel, respectively.

Figure 3:
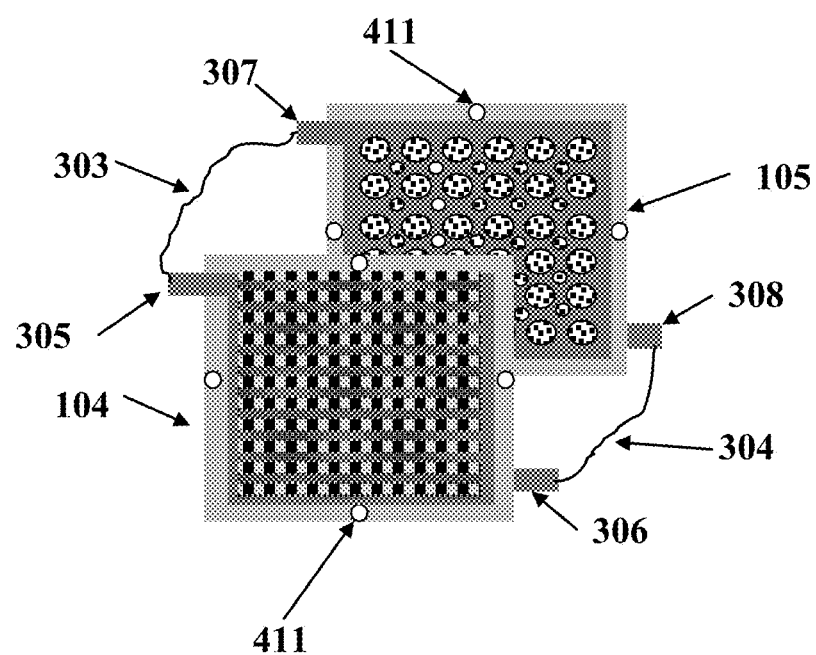
FIG. 3 is a schematic illustration of the electric connections of Cell-1 and Cell-2.

In operation, the cathode of Cell-1 104 (positive electrode of Cell-1) is connected to the anode of Cell-2 105 (positive electrode of Cell-2); and the anode of Cell-1 104 (negative electrode of Cell-1) is connected to the cathode of Cell-2 105 (negative electrode of Cell-2). The electrodes are connected via cathode current collectors and anode current collectors present in each cell. This is illustrated in FIG. 3, wherein the cathode of Cell-1 104 is connected to the anode of Cell-2 105 via cathode lead 305 of the cathode current collector of Cell-1 104 and anode lead 307 of the anode current collector of Cell-2, 105, via electric wire 303. The anode of Cell-1 104 is connected to the cathode of Cell-2 105 via anode lead 306 of the anode current collector of Cell-1, 104, and the cathode lead 308 of the cathode current collector of Cell-2 105 via electric wire 304. Metal, conductive wires, such as copper and the like, may be used to connect the respective electrodes.

FIG. 4 provides an exploded and further detailed view of the arrangement of the individual components within the power-free apparatus as illustrated in FIG. 1A and FIG. 1B herein. Cell-2 105 is disposed between fuel chamber 101 and hydrogen chamber 102; Cell-1 104 is disposed on the opposite side of the fuel chamber 101, between the fuel chamber 101 and air convection window 103 as illustrated. As shown, the MEAs of Cell-1 104 and Cell-2 105, the first housing 108, the second housing 109, and the housing 110 each include four holes 411 through which screws, bolts, or the like may be inserted to assemble the individual components of the apparatus as set forth. As an alternative, the components may be coupled to one another using other conventional connectors/fasteners such as brackets, clips, and the like, or they may be secured to one another using adhesives. The component parts are to be assembled and secured in such a fashion so that there is no fuel and gas leakage. Teflon® gaskets, silicon-coated Teflon® sheets, or the like may be used to seal the various components of the apparatus for such purpose. One having ordinary skill in the art with knowledge of the invention as described herein will be able to select suitable means with which to properly secure and seal the components of the apparatus herein to one another.

The apparatus may be modular; therefore, for ease in identifying the order in which these components are to be assembled, relative component numbers may be assigned to each component as follows: (1) air window 103 as defined by housing 110 may be identified as the first component, (2) Cell-1 104 as the second component, (3) first chamber 101 as defined by first housing 108 as the third component, (4) Cell-2 105 as the fourth component, and (5) second chamber 102 as defined by second housing 109 as the fifth component. The components are assembled in that order.

In use, fuel solution is added to the fuel chamber 101 via aperture 106, and the electrodes of Cell-1 104 and Cell-2 105 connected as illustrated in FIG. 3. The fuel solution may be added either before or after the electrodes of Cell-1 104 and Cell-2 105 are connected. In the preferred embodiment, fuel is added to fuel chamber 101 prior to connecting the electrodes. Ambient air is supplied to the apparatus (via the cathode of Cell-1 104) by spontaneous convection through, for example, a convection window 103. Cell-1 104 generates electric power, which power is used by Cell-2 105 to continuously generate hydrogen gas by electrolysis of the fuel solution present in the fuel chamber 101. Hydrogen gas is continuously generated into the hydrogen chamber 102, and the hydrogen gas generated exits through the aperture 107 of hydrogen chamber 102 for use thereof. Fuel oxidation occurs at the two anodes—anode of Cell-1 104 and anode of Cell-2 105. Oxygen reduction occurs at the cathode of Cell-1 104 to generate water; and proton reduction occurs at the cathode of Cell-2 105 to generate hydrogen. The protons needed by the cathode of Cell-2 105 are generated from its anode by the reaction of fuel oxidation.

Suitable electrochemical cell component parts and fuels may be described as follows:

Membrane Electrode Assembly (MEA):

MEAs comprise an electrolyte membrane sandwiched between an anode and a cathode. MEA-1 and MEA-2, the MEA present in Cell-1 and Cell-2, respectively, may be the same or different. For example, they may each employ the same or different electrolyte membranes and/or catalysts for the electrodes. MEA-1 may be a proton exchange membrane-MEA (PEM-MEA) or an anion exchange membrane MEA (AEM-MEA); while MEA-2 may be a PEM-MEA, an AEM-MEA or a bipolar-MEA.

PEM-MEAs employ proton exchange membranes such as, for example purposes only, Nafion® membranes (DuPont Co.), XUS® membranes (Dow Chemical), zirconium hydrogen phosphate modified Nafion®, silica and molybdophosphoric acid modified Nafion®, organic-inorganic composite membranes, and polybenzimidazole based membranes. Examples of other types of membrane materials that may be used and the process of converting these materials into suitable proton exchange membranes are set forth, for example, in U.S. Pat. No. 6,432,284 (Narayanan et al.), "Hydrogen Generation by Electrolysis of Aqueous Organic Solutions," issued 13 Aug. 2002, the teachings of which are incorporated herein by reference.

Although stable anion exchange membranes are not yet commercially available, it is believed that AEM-MEAs that employ stable anion exchange membranes, such as those described in U.S. Pat. No. 8,436,057 (Verkade et al.), "Anion Exchange Membrane," issued 7 May 2013; U.S. Pat. No. 8,440,366 (Fukuta et al.), "Solid Polymer Electrolyte Fuel Cell Membrane with Anion Exchange Membrane," issued 14 May 2013; and U.S. Pat. No. 8,476,323 (Martinent et al.), "Fluorocarbon Polymer Material and Method for Synthesizing," issued 2 Jul. 2013 may be employed as well. The teachings of these United States patents are incorporated herein by reference in their entirety.

A bipolar-MEA employs a bipolar electrolyte membrane, which is a membrane having two layers, one for cation exchange, and the other for anion exchange. In MEA-2 (209), the cation exchange layer would be in contact with the anode therein, which faces towards the fuel chamber; and the anion exchange layer would be in contact with the cathode therein, which faces the hydrogen chamber. Applicants believe that the use of bipolar membrane in MEA-2 (209) would enhance hydrogen production efficiency. Suitable bipolar electrolyte membranes include those taught, for example, in U.S. Pat. No. 7,344,801 (Cheng et al.), "High Voltage Duel Electrolyte Electrochemical Power Sources," issued 18 Mar. 2008; U.S. Pat. No. 6,596,137 (Nago et al.), "Bipolar Membrane," issued 22 Jul. 2003; and U.S. Pat. No. 6,924,318 (Mischi et al.), "Method for Making a Bipolar Membrane and Use of Resulting Bipolar Membrane," issued 2 Aug. 2005. The teachings of these patents are incorporated herein by reference in their entirety.

The thickness of the electrolyte membrane that may be employed in MEA-1 and MEA-2 may range, for example, from approximately 80 to approximately 300 micrometers and from approximately 25.4 to approximately 180 micrometers, respectively. The invention, however, is not limited thereto. Of note is that more than one electrolyte membrane may be pressed together to vary the thickness of the electrolyte membrane employed. One having ordinary skill in the art with knowledge of the present invention will be able to select suitable electrolyte membranes that may be employed herein, as well as suitable thicknesses to employ.

Catalysts, for example purposes only, such as platinum or a platinum/ruthenium (PtRu) alloy, coated directly onto carbon cloth, and pressed to opposite sides of the electrolyte membrane may serve as the anode and cathode of the MEAs. One side of the MEA would serve as the anode, and the other as the cathode. As an alternative, the catalysts may be coated directly onto opposite sides of the electrolyte membrane and serve as the respective electrodes. Coating the catalyst directly onto the electrolyte membrane is preferred, and provides a better interface with the membrane. Catalyst loading may range, for example, from approximately 1.0 mg/cm$^2$ to approximately 4.0 mg/cm$^2$. Conventional methods of preparing MEAs, and MEAs prepared using conventional methods may be employed herein.

Anode and Cathode Current Collectors:

Suitable anode and cathode current collectors that may be employed herein are those that provide for passage of fuel and gas therethrough, and have a tab/lead portion or the like to facilitate electrical connections. Anode and cathode current collectors may, for example, be perforated—have holes therein—see, for example, the current collectors illustrated and described in U.S. Pat. No. 8,383,290 (Jiang et al.), "Fuel Cell Assembly," issued 26 Feb. 2013, the teachings of which are incorporated herein by reference. Metals or metal alloys that are electrically conductive and resistant to chemical and electrochemical corrosion are suitable for use as the current collectors herein. Suitable materials that may be used include titanium, stainless steel, nickel, gold coated stainless steel, and the like.

Gas Diffusion Layers and Air Filter:

Each of Cell-1 and Cell-2 has a first gas diffusion layer and a second gas diffusion layer. The first gas diffusion layer in each of Cell-1 and Cell-2 is disposed between the MEA and the cathode current collector therein—illustrated as 204 in Cell-1 and 208 in Cell-2. The second gas diffusion layer in each of Cell-1 and Cell-2 is disposed between the MEA and the anode current collector therein—illustrated as 202 in Cell-1 and 210 in Cell-2. Cell-1 may optionally have an air filter disposed adjacent the cathode current collector, on the side opposite the first gas diffusion layer—illustrated as 206.

In operation, oxidizing agent (i.e., air) enters the apparatus through Cell-1, while water is to be rejected. The first gas diffusion layer of Cell-1 and/or the optional air filter of Cell-1 are present to facilitate this. Therefore, the level of hydrophobicity of at least one of the first gas diffusion layer in Cell-1 or the air filter, if present, is such as to be suitable for diffusion of oxygen, while rejecting diffusion of water therethrough. The first gas diffusion layer of Cell-2 is for diffusion of hydrogen, while rejecting diffusion of water; therefore, the level of hydrophobicity for it is such as to be suitable for said purpose. The second gas diffusion layer in each cell is for the diffusion of fuel and water. The level of hydrophobicity for the second gas diffusion layers, therefore, is such as to facilitate diffusion of fuel and water. The gas diffusion layers and air filter employed herein all have some level of hydrophobicity. One having ordinary skill in the art will be able to identify suitable materials that may be employed for the gas diffusion layers and air filter herein.

Carbon cloth coated with carbon powder and Teflon® (a polytetrafluoroethylene by DuPont Co.), for example, may be used for the gas diffusion layers and the air filter. The hydrophobicity of such materials depends on the Teflon® content therein. In some embodiments, the first gas diffusion layers may comprise carbon cloth coated with a mixture of carbon powder and Teflon®, where the Teflon® content is greater than approximately 20% wt., but less than approximately 40% wt. for diffusion of hydrogen and oxygen, while rejecting diffusion of water (i.e., E-TEK Elat carbon cloth 2.20); and the second gas diffusion layer comprises carbon cloth coated with a mixture of carbon powder and Teflon®, where the Teflon® content is less than approximately 10% wt., but greater than approximately 2% wt. for diffusion of fuel (i.e., E-TEK Elat carbon cloth 2.02). In the preferred embodiment, gas diffusion layers 202, and 210 may be carbon cloth coated with a mixture of carbon powder and Teflon®, having a Teflon® content between approximately 2% and 10%; and gas diffusion layers 204 and 208, and air filter 206 may be carbon cloth coated with a mixture of carbon powder and Teflon®, having a Teflon® content between approximately 20% and 40%. Carbon cloth coated with carbon powder and Teflon® having specified properties are commercially available, or may be prepared using conventional techniques. Selection of a suitable material to employ as the first gas diffusion layer, second gas diffusion layer and air filter for the purpose intended herein is well within the skill of the art.

Fuels:

Fuels that may be employed in the present invention include, for example purposes only, methanol, 2-propanol, ethanol, and other alcohols. Although the invention is described with reference to the use of alcohol as the fuel, the invention is not so limited as other fuels that are water soluble may be suitable for use herein as well. Such other fuels include, for example purposes only, formic acid, metal hydride, glucose and hydrazine. Suitable concentrations of fuels that may be used in the apparatus and method described may range, for example, from approximately 0.4M to approximately 4.0M.

When methanol is used as the fuel, the reactions at Cell-1 and Cell-2 are as follows:

Cell-1 Anode Reaction:

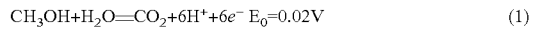
$$CH_3OH + H_2O = CO_2 + 6H^+ + 6e^- \quad E_0 = 0.02V \quad (1)$$

Cell-1 Cathode Reaction:

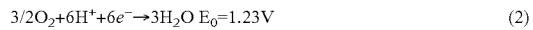
$$3/2 O_2 + 6H^+ + 6e^- \rightarrow 3H_2O \quad E_0 = 1.23V \quad (2)$$

Cell-1 Overall Reaction:

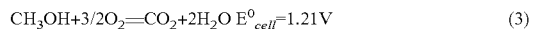
$$CH_3OH + 3/2 O_2 = CO_2 + 2H_2O \quad E^0_{cell} = 1.21V \quad (3)$$

Due to over potentials, the actual open circuit voltage of Cell-1 is about 0.7V, and operational at 0.4V.

Cell-2 Anode Reaction:

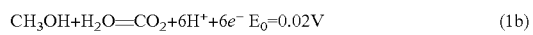
$$CH_3OH + H_2O = CO_2 + 6H^+ + 6e^- \quad E_0 = 0.02V \quad (1b)$$

Cell-2 Cathode Reaction:

$$6H^+ + 6e^- \rightarrow 3H_2 \quad E^0 = 0.0V \quad (4)$$

Cell-2 Overall Reaction:

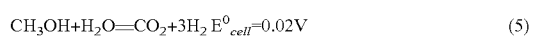
$$CH_3OH + H_2O = CO_2 + 3H_2 \quad E^0_{cell} = 0.02V \quad (5)$$

Hydrogen generation rate using the apparatus of the present invention was determined using different concentrations of methanol as the fuel. The yield of fuel conversion to hydrogen was determined to range from approximately 30% to approximately 90%. Theoretically, two molecules of methanol can generate three molecules of hydrogen. Without wishing to be bound by theory, using the present invention, 100 g of pure methanol can generate approximately 9.38 g, or 105 liters, of hydrogen gas.

General Description of Experiments

Nafion 117 (DuPont Co.) was pretreated in boiling water with 3% $H_2O_2$ for two hours, then boiled in 1 M $H_2SO_4$ for two hours. After each treatment, it was thoroughly washed with water. It was then stored in water for membrane electrode assembly (MEA) preparation.

Platinum black (Johnson Matthey Company) and 5% Nafion solution (Aldrich Company) were purchased and used to prepare a catalyst ink having 90% by weight platinum black and 10% by weight dry Nafion. The catalyst ink was coated on 0.2 mm thick carbon cloth (E-Tek), and dried at 80° C. Catalyst loading was 2 mg/cm². The coated carbon cloth was used as the cathode for Cell-1 and Cell-2.

PtRu black (Johnson Matthey Company) and 5% Nafion solution (Aldrich Company) were purchased and used to prepare a catalyst ink containing 85% by weight PtRu and 15% by weight dry Nafion. The PtRu ink was coated on 0.2 mm thick carbon cloth (E-Tek), and dried at 80° C. Catalyst loading was 2 mg/cm². The PtRu-coated carbon cloth was used for the anode for both Cell-1 and Cell-2.

The Pt-coated carbon cloth and the PtRu-coated carbon cloth prepared were hot-pressed at 120-125° C. to the pretreated Nafion 117 to form the MEA for each cell. The area of each MEA prepared was 9 cm². A titanium sheet having a thickness of 0.5 mm was used as the cathode and anode current collectors. ELat-V2.20 (E-TEK) was used as the first gas diffusion layers; ELat-V2.02 (E-TEK) was used as the second diffusion layers. The housings of the fuel storage chamber, hydrogen storage chamber, and air window were made with plastic materials. The fuel storage chamber and the hydrogen chamber each had a volume of approximately 8 ml. The components of the apparatus were assembled as shown in FIG. 4 using screws. Teflon® thin-film was used as a gasket for sealing between the components.

Electrochemical evaluation of the apparatus was carried out using a conventional battery test station. All electrochemical measurements were conducted at 30° C. The fuel used in evaluation of the apparatus was 8 ml methanol at various concentrations (0.5M, 1.0M, 2.0M and 4.0M), or 8 ml of 4.0M 2-propanol. Air was provided by air-convection.

Example 1

Figure 5:
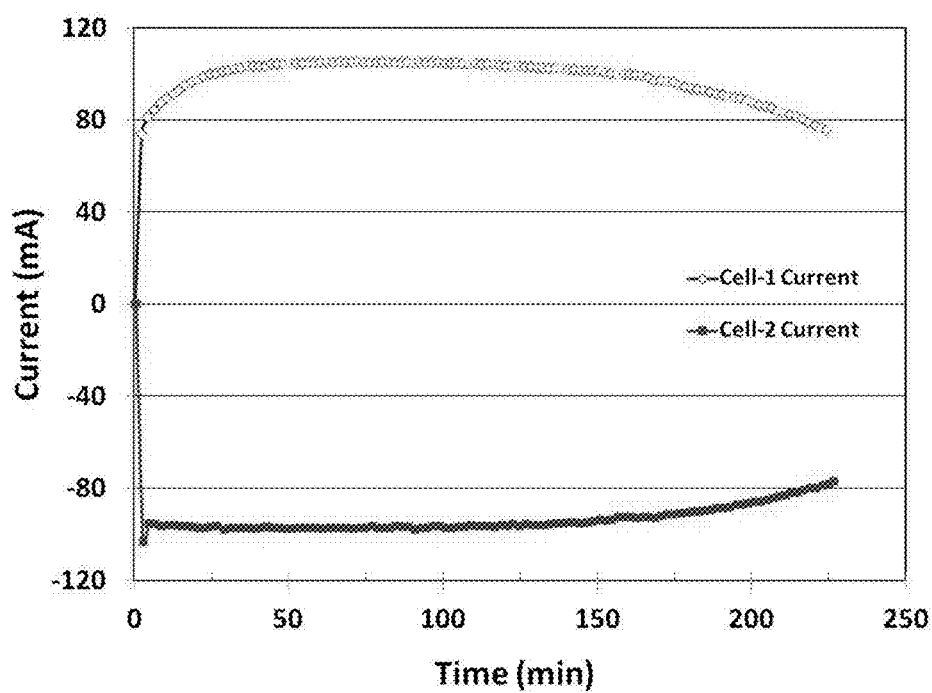
FIG. 5 is a graphical representation of Cell-1 and Cell-2 currents at 0.4V of a power-free apparatus for hydrogen generation with 8 ml 2M methanol as fuel.

The performance of Cell-1 and Cell-2 in the apparatus was evaluated by discharging Cell-1 at 0.4V, and charging Cell-2 at 0.4V. The two cells shared the same 8 ml 2M methanol present in the fuel chamber, and operated at the same time. As shown in FIG. 5, the discharge current of Cell-1 at 0.4V is approximately equal to the charge current of Cell-2 at 0.4V. Cell-1 has full capability to generate electric power to charge Cell-2. Shown is that Cell-2 will generate the same equivalent hydrogen as that of the consumed methanol in Cell-1—see Eq. (5). Hydrogen is generated from the empty hydrogen storage chamber to which Cell-2 is disposed.

Example 2

Figure 6:
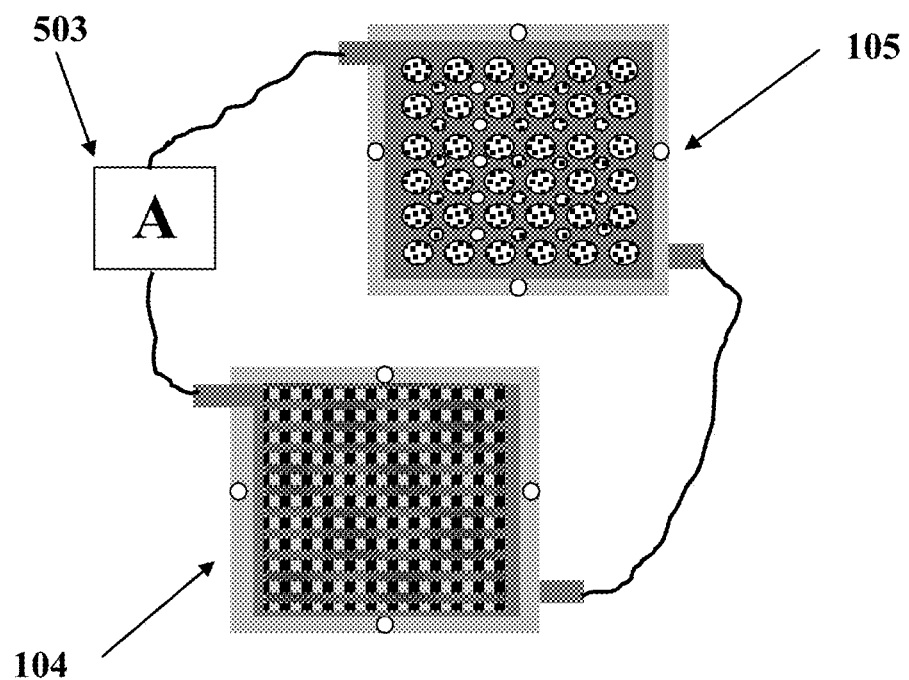
FIG. 6 is a schematic illustration of the connection of the electrodes of Cell-1 with the electrodes of Cell-2 for determination of hydrogen generation by current measurement.

Experiments were conducted using the power-free apparatus and different concentrations of methanol to generate hydrogen. Methanol was first supplied to the fuel chamber, and the electrodes then connected. The cathode (positive electrode) of Cell-1 was connected with the anode (positive electrode) of Cell-2; and the anode (negative electrode) of Cell-1 was connected with the cathode (negative electrode) of Cell-2. Electric current between the cells was measured via a conventional battery test station 503 as shown in FIG. 6.

Figure 7:
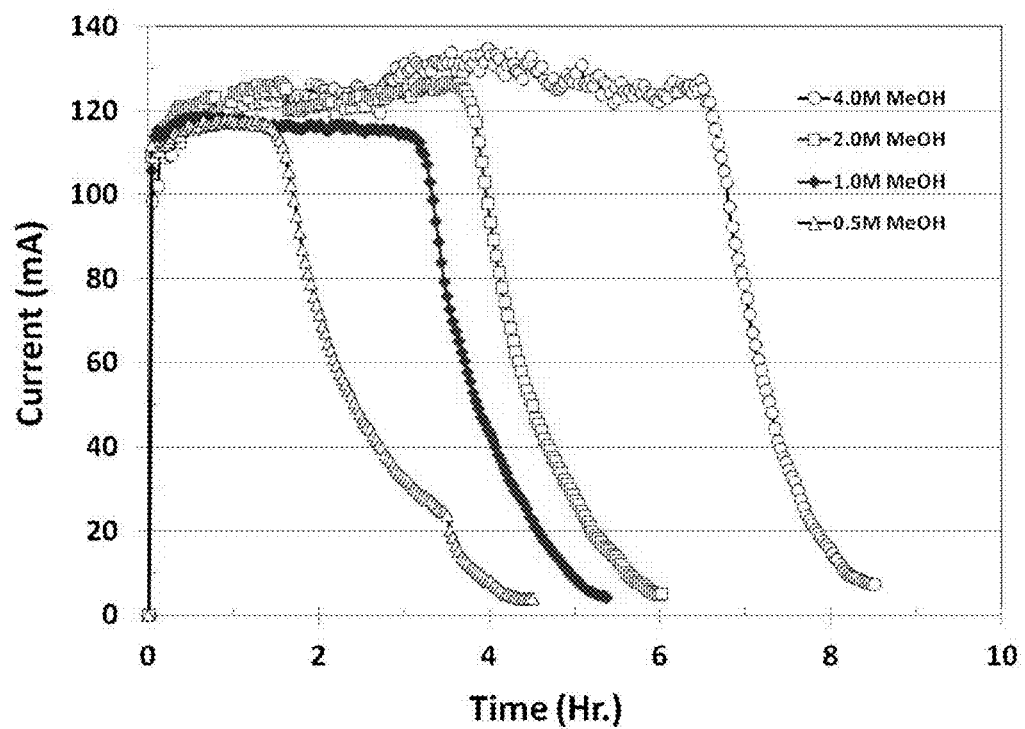
FIG. 7 is a graphical representation of measured current (mA) over time using 8 ml of methanol at various concentrations (0.5M, 1.0M, 2.0M and 4.0M).
Figure 8:
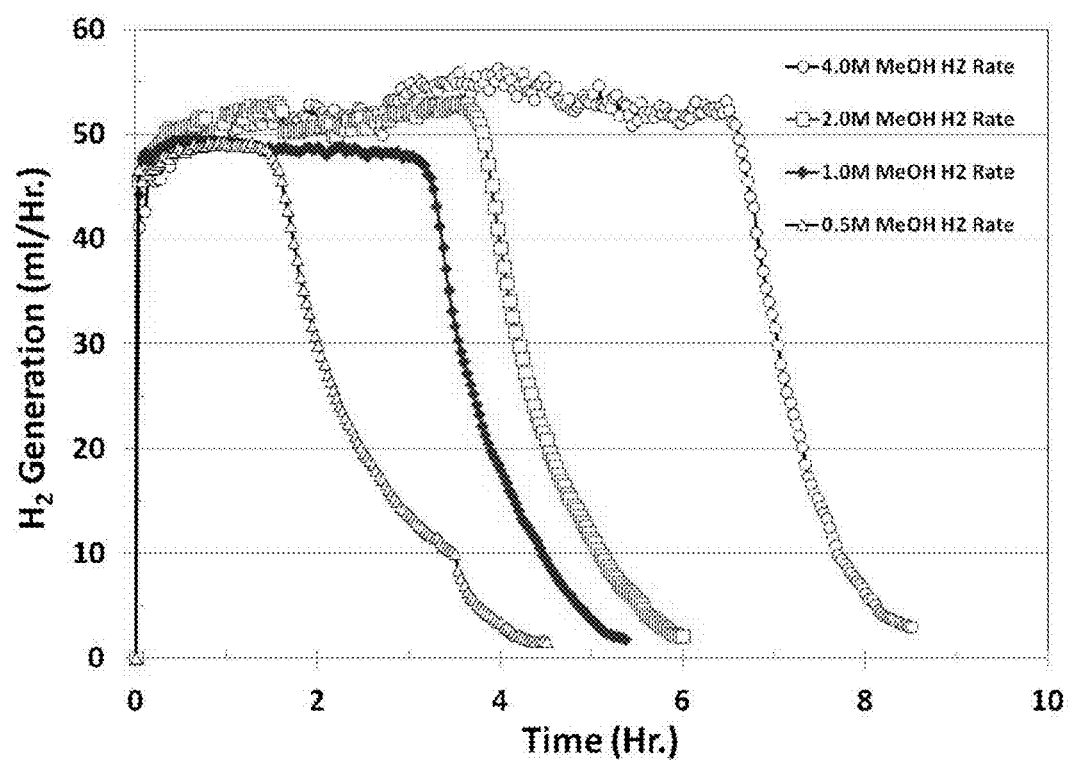
FIG. 8 is a graphical representation of calculated hydrogen generation rate in ml/hour over time based on the data set forth in FIG. 7.

Current-time curves of the power-free apparatus obtained by supplying 8 ml methanol having concentrations of 0.5M, 1.0M, 20M, and 4.0M, respectively, are set forth in FIG. 7. Higher methanol concentration was found to provide increased operation time, and generate greater amounts of hydrogen. The rate of hydrogen generation calculated using the data in FIG. 7 is set forth in FIG. 8. The hydrogen generation rates for the various methanol concentrations used are almost the same at the plateau time range in FIG. 8, about 50-55 ml/hr.

Figure 9:
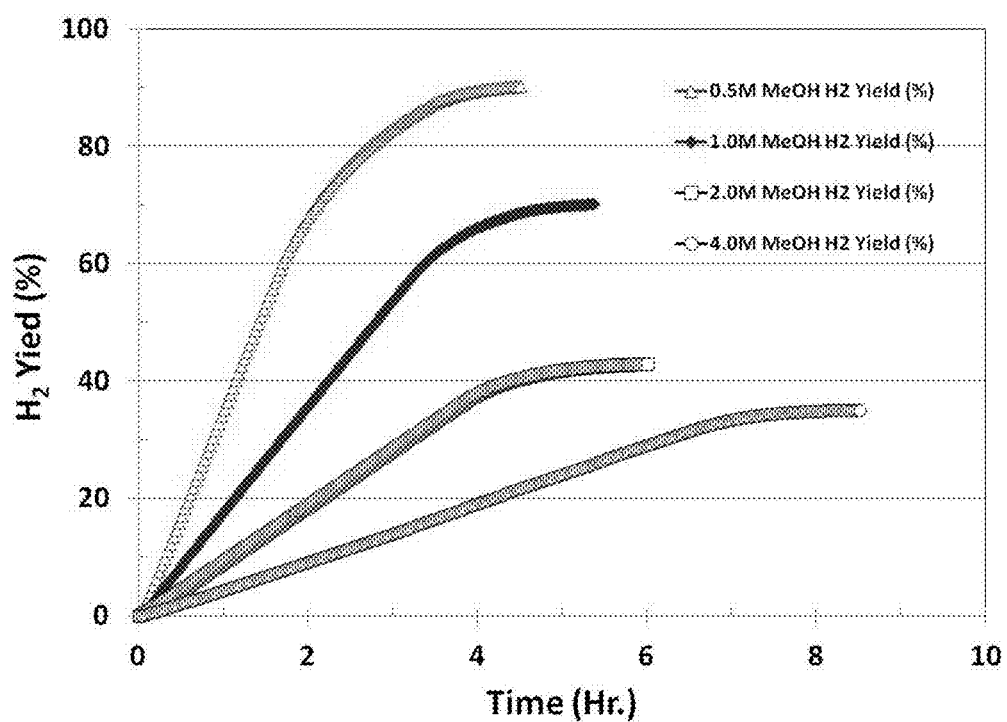
FIG. 9 is a graphical representation of percent yield of hydrogen generation over time based on the data set forth in FIG. 7.

Percent hydrogen yield calculated using the data in FIG. 7 is set forth in FIG. 9. Shown is that the lower concentrations of methanol generated a greater percentage of hydrogen yield as compared to higher concentrations. The percent hydrogen yield decreased with increasing methanol concentration. Methanol concentration of 0.5M generated a hydrogen yield of approximately 90%. Based on these findings, 100 g of pure methanol is expected to generate approximately 8.4 g of hydrogen.

Example 3

Figure 10:
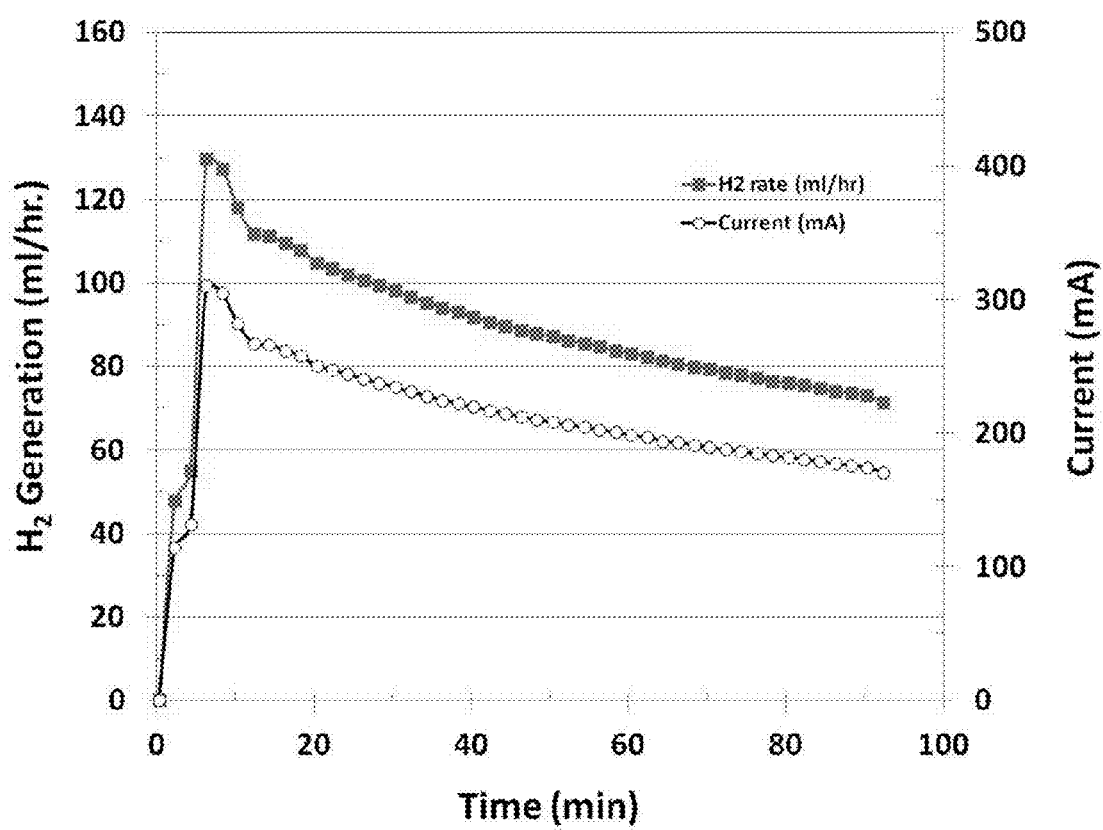
FIG. 10 is a graphical representation of measured current and calculated hydrogen generation rate using 8 ml of 4.0M 2-propanol as the fuel.

The experiment of Example 2 was conducted using 8 ml of 4.0M 2-propanol as the fuel. FIG. 10 shows a current-time curve and the calculated hydrogen generation rate using 4.0M 2-propanol. The hydrogen generation rate using 4.0M 2-propanol was found to be greater than the rate using methanol. The hydrogen generation rate reached 130 ml/hr, and decreased with time due to fuel consumption.

The invention may be used to support hydrogen fuel cells, lab scale hydrogen generation, and the like. In particular, it may be used as a low pressure hydrogen generating source for hydrogen/air fuel cells. The invention provides an environmentally friendly hydrogen generating apparatus that does not use metal (i.e., zinc and aluminum) and acid to generate hydrogen gas. The present invention may further find application in providing low cost hydrogen for industrial application, such as the synthesis of ammonia, and hydrochloric acid, and for providing hydrogen gas for glass shops for processing quartz parts, and use as a reducing reagent for chemical, pharmaceutical and catalyst synthesis.

The apparatus herein, which generates low pressure hydrogen gas, may be directly coupled with a hydrogen fuel cell and other equipment that require a source of low pressure hydrogen. Coupling may be accomplished, for example, via use of tubing, wherein one end of the tubing is attached to the aperture of the hydrogen chamber from which hydrogen gas produced exits, and the second end of the tubing is attached to, for example, a hydrogen fuel cell. One having ordinary skill in the art will be able to identify other suitable methods that may be used to couple the apparatus with equipment that require a source of low pressure hydrogen. Low pressure hydrogen gas generated using the apparatus may be pressurized for containerization and transportation using conventional methods well known to a person of ordinary skill in the art.

The apparatus operates at room temperature (approximately 10-30° C.), has an operating temperature of approximately 0° C.-100° C., generates relatively pure hydrogen gas, displays high energy efficiency, and results in a high hydrogen conversion percentage.

One having ordinary skill in the art will recognize that performance of the apparatus herein may be adjusted by varying the materials and properties of Cell-1 and Cell-2 herein. For example, one may optimize the performance of the apparatus by varying catalyst type, catalyst loading, electrolyte membrane thickness, the hydrophobicity of the gas diffusion layers (i.e., via Teflon® and carbon content), hole distribution present in the current collectors, and the pressure applied to the various component parts in making the apparatus herein. Of note is that MEA-1 and MEA-2 within the respective electrochemical cells may be the same or different. To optimize performance of the apparatus, for example, a thicker electrolyte membrane might be used in MEA-1 as compared to that used in MEA-2 so as to reduce fuel crossover into the air convection area.

While particular embodiments of the present invention have been shown and described, it will be obvious to those skilled in the art that changes and modifications may be made without departing from this invention. Therefore, it is intended that the claims herein are to include all such obvious changes and modifications as fall within the true spirit and scope of this invention.

We claim:

1. An apparatus for power-free generation of hydrogen, wherein said apparatus comprises
    a first electrochemical cell and a second electrochemical cell, wherein said first electrochemical cell and said second electrochemical cell each comprises a membrane electrode assembly (MEA) having an electrolyte membrane sandwiched between an anode and a cathode, said MEA disposed between a cathode current collector and an anode current collector, a first gas diffusion layer disposed between said MEA and said cathode current collector, and a second gas diffusion layer disposed between said MEA and said anode current collector;
    a first chamber having an aperture; and
    a second chamber having an aperture;
    wherein said second electrochemical cell is disposed between said first chamber and said second chamber so that the anode of said second electrochemical cell is in fluid communication with said first chamber, and the cathode of said second electrochemical cell is in fluid communication with said second chamber;
    wherein said first electrochemical cell is disposed on the side of said first chamber opposite the second electrochemical cell so that the anode of said first electrochemical cell is in fluid communication with said first chamber, and the cathode of said first electrochemical cell is in fluid communication with an oxidizing agent; and
    wherein hydrogen generated into said second chamber during operation of said apparatus exits through said aperture therein.

2. The apparatus of claim 1, further comprising an air convection window, wherein the cathode of said first electrochemical cell is disposed at said air convection window.

3. The apparatus of claim 1, wherein first electrochemical cell may further comprise an air filter disposed adjacent the cathode current collector.

4. The apparatus of claim 1, wherein said cathode current collector and said anode current collector are perforated so as to permit the flow of fuel and gas therethrough.

5. The apparatus of claim 1, wherein said first gas diffusion layer has a level of hydrophobicity suitable for diffusion of oxygen and hydrogen, while rejecting diffusion of water therethrough; and wherein said second gas diffusion layer has a level of hydrophobicity suitable for diffusion of fuel and water.

6. The apparatus of claim 1, wherein the electrolyte membrane in the MEA of said first electrochemical cell is a proton exchange membrane or an anion exchange membrane, and wherein the electrolyte membrane in the MEA of said second electrochemical cell is a bipolar electrolyte membrane.

7. The apparatus of claim 1, wherein said first chamber is defined by a first housing having a first open side and a second open side, said first open side and said second open side being in spaced apart relationship, and wherein said first housing has an aperture;

wherein said second chamber is defined by a second housing having one open side, and having an aperture;

wherein said first electrochemical cell is disposed at said first open side of said first housing so that the anode of said first electrochemical cell is in fluid communication with said first open side;

wherein said second electrochemical cell is disposed at said second open side of said first housing so that the anode of said second electrochemical cell is in fluid communication with said second open side, and wherein said second electrochemical cell is also disposed at said one open side of said second housing so that the cathode of said second electrochemical cell is in fluid communication with said one open side of said second housing; and wherein the cathode of said first electrochemical cell is in fluid communication with an oxidizing agent.

8. The apparatus of claim 7, further comprising an air convection window;

wherein the cathode of said first electrochemical cell is in fluid communication with an oxidizing agent via said air convection window.

9. The apparatus of claim 8, wherein said apparatus is a modular apparatus comprising a plurality of components, said apparatus comprising a first component comprising said air convection window;

a second component comprising said first electrochemical cell;

a third component comprising said first chamber defined by said first housing;

a fourth component comprising said second electrochemical cell; and a fifth component comprising said second chamber defined by said second housing;

wherein said components are assembled in such order.

10. The apparatus of claim 9, wherein said components are assembled via connectors.

11. The apparatus of claim 1, wherein said first chamber and said second chamber are both defined by a single housing having an opening exposed to an oxidizing agent, and a wall opposite said opening; and wherein said wall opposite said opening defines the side of the second chamber opposite said second electrochemical cell.

12. The apparatus of claim 11, wherein said first electrochemical cell and said second electrochemical cell are both disposed within said housing.

13. The apparatus of claim 11, wherein said first electrochemical is disposed at said opening exposed to an oxidizing agent; and wherein said second electrochemical cell is disposed within said housing.

14. The apparatus of claim 13, wherein said apparatus further comprises an air convection window, wherein said cathode of said first electrochemical cell is in fluid communication with said air convection window.

15. The apparatus of claim 11, wherein said housing comprises at least one slot within which an electrochemical cell may be inserted into said single housing.

16. A method for generating hydrogen gas from fuel solutions without the use of an external power source or external heat source, wherein said method employs the apparatus of claim 1, and the method comprises providing fuel to said first chamber;

connecting the cathode of said first electrochemical cell with the anode of said second electrochemical cell; and connecting the anode of said first electrochemical cell with the cathode of said second electrochemical cell.

17. The method of claim 16, wherein said fuel is selected from the group consisting of methanol, ethanol, 1-propanol, 2-propanol, ethylene glycol, formic acid, sodium boron hydride and hydrazine.

18. The method of claim 17, wherein the concentration of said fuel is approximately 0.5M to approximately 4.0M.

* * * * *